United States Patent [19]

Näsvall et al.

[11] Patent Number: 5,271,523
[45] Date of Patent: Dec. 21, 1993

[54] DISPENSER

[75] Inventors: Alf Näsvall, Sundbyberg; Magnus Schnürer, Älvsjö, both of Sweden

[73] Assignee: NobelTech Electronics AB, Jarfalla, Sweden

[21] Appl. No.: 875,285

[22] Filed: Apr. 29, 1992

[30] Foreign Application Priority Data

Apr. 29, 1991 [SE] Sweden ................... 9101305

[51] Int. Cl.$^5$ ............................................. B65G 59/00
[52] U.S. Cl. ................................. 221/185; 221/199; 221/222; 221/231; 221/278
[58] Field of Search ............... 221/185, 199, 222, 221, 221/226, 231, 236, 278

[56] References Cited

U.S. PATENT DOCUMENTS

| 4,134,115 | 9/1979 | Ström . | |
|---|---|---|---|
| 4,650,092 | 3/1987 | Andersson et al. | 221/231 X |
| 5,018,249 | 5/1991 | Andersson et al. | 221/231 X |

FOREIGN PATENT DOCUMENTS 419899  8/1981  Sweden .
435964 10/1984  Sweden .

*Primary Examiner*—David H. Bollinger
*Attorney, Agent, or Firm*—Pollock, Vande Sande & Priddy

[57] ABSTRACT

A dispenser to be used with an air craft includes a body member, and a magazine accommodated in the body member. The magazine is provided with a feeding out opening at one end thereof and accommodates a number of packages arranged in a row extending from the feeding out opening throughout the magazine. The magazine includes a feeding out and separation device provided adjacent the feeding out opening for separating and feeding out a package in the row located closest to the feeding out opening of the magazine. The dispenser also includes air guiding member provided on the body member to guide an air stream in to the feeding out opening of the magazine in order to create a pressure differential at the feeding out opening acting to facilitate removal of packages, released by the feeding out and separation device, from the feeding out opening.

6 Claims, 2 Drawing Sheets

DISPENSER

FIELD OF THE INVENTION

The present invention relates to a dispenser intended to be provided on an air craft, such as an airplane, and comprising a magazine provided with a feeding out opening and a feeding out and separation device, the magazine accommodating a number of packages arranged in a row from the feeding out opening and containing jamming means, preferably radar chaff, the feeding out and separation device separating and feeding out the packages located closest to the feeding out opening of the magazine.

BACKGROUND OF THE INVENTION

Such a dispenser is previously known from, for example, SE B 8302508-0. In that case the separation of packages at the feeding out opening of the magazine is carried out by in separation means in the shape of gear wheels cooperation with means on the packages similar to teeth. Commonly, the dispenser is applied on the underside of an air craft, preferably an airplane, and has an elongated body shape with its longitudinal direction coinciding with the flight direction of the air craft. The elongated body is exposed to air streaming having a speed corresponding to the flight speed of the air craft. The feeding out opening of the magazine terminates the rear section of the dispenser. During a flight a wake is formed behind the feeding out opening. Immediately behind the dispenser, the wake has a sectional area of the same order of magnitude as the sectional area of the dispenser. The formation of this wake among other things, influences the separation time of the packages, that is the time required for the package located closest to feeding out opening to separate from the rest of the packages in the magazine and to leave the feeding out opening.

SUMMARY OF THE INVENTION

It is an object of the present invention to reduce the separation time and obtain a distinct separation of the packages and due to that possibility to improve the radar target area. According to the present invention this is obtained by means of a dispenser characterized in that air guiding means are provided on the dispenser to guide an air stream to the feeding out opening of the magazine in order to create a pressure differential acting to remove packages released at the feeding out opening from the feeding out opening of the dispenser.

The pressure differential obtained by means of the guiding of air results in a reduced separation time and a distinct separation. Due to the reduced separation time the reaction time of the dispenser may be shortened. The fact that the separation of the packages is distinct, furthermore implies that a plurality of dispensers may be coordinated at a high accuracy and thereby the target area may be enlarged. The separation time shortened by air guiding and the distinct separation related thereto also permits that separate radar chaff cloudes may be obtained according to fixed preprogrammed patterns. Preferably a plurality of the dispensers may be coordinated to generate the patterns.

According to one, favourable embodiment of the present invention, the dispenser is characterized in that the air guiding means are air scoops provided with an air inlet at the side of the dispenser and an air outlet adjacent the feeding out opening. Due to the location of the air scoops, a vortex is generated. Superposed on the cross streaming created behind the dispenser by the air scoops there is the free stream, resulting in that the streaming is deflected backwards so that a three dimensional vortex is formed.

The present invention will now be described in more detail with reference to the accompanying drawings, in which:

DETAILED DESCRIPTION OF THE PREFERRED EMBODIMENT(S)

Figure 1:
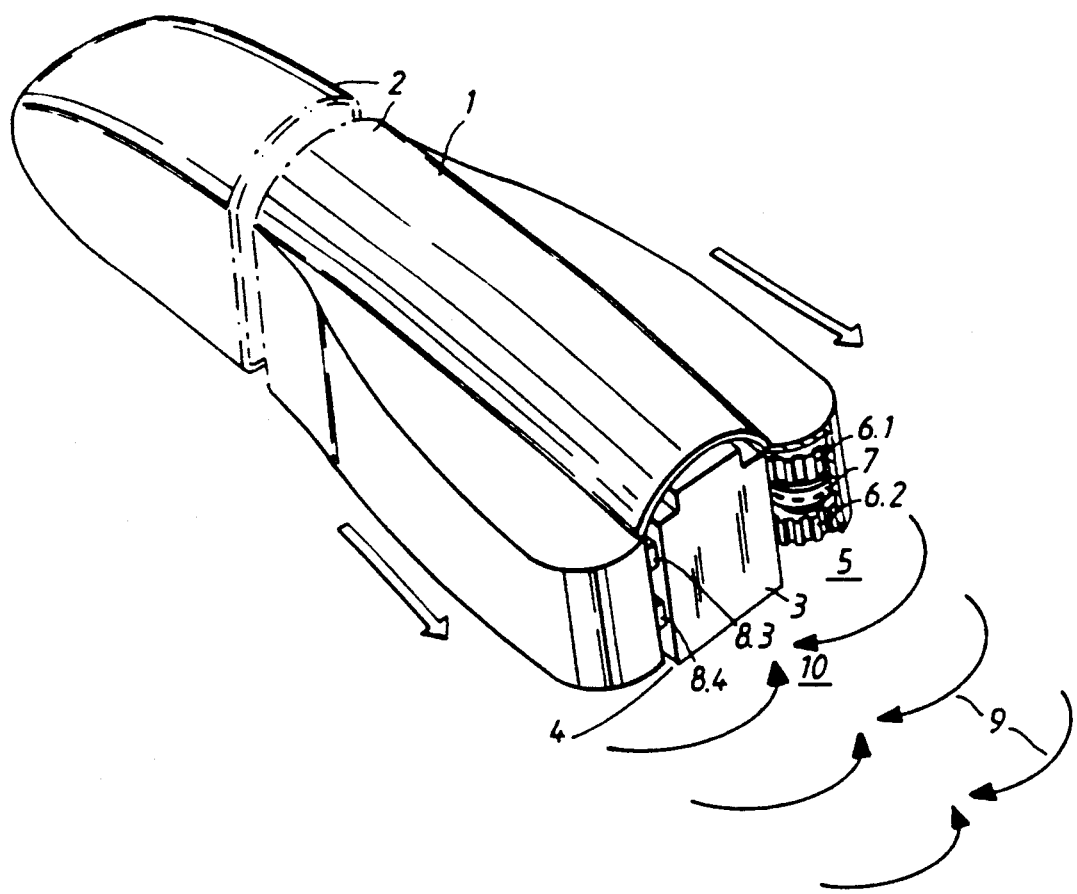
FIG. 1 shows a schematical perspective view of a dispenser without air guiding

The dispenser shown in FIG. 1 has an elongated body 1 accommodating a magazine 2 containing packages 3. The elongated body is only partly shown in the Figure. adjacent to the feeding out opening 4 of the magazine 2 there is provided a feeding out and separation device 5. The feeding out and separation device 5 in the shown embodiment comprises two gear wheels on each side of the feeding out opening 4 of the magazine 2, two gear wheels 6.1, 6.2 being shown. The gear wheels are driven by a driving device, not shown, via a driving belt 7. The packages 3 are provided with means similar to teeth 8.1–8.4 cooperating with the gear wheels 6.1–6.4. The teeth of the gear wheels during separation release the package located closest to the feeding out opening while at the same time the packages located behind are retained. The arrows 9 shows schematically shows the air streams present at the rear section of the dispenser when the dispenser is moved in the air space. A wake 10 arises in the region behind the feeding out opening 4. The wake delays the separation of the rear package from the rest of the packages and causes a large variation in separation time for the individual packages.

Figure 2:
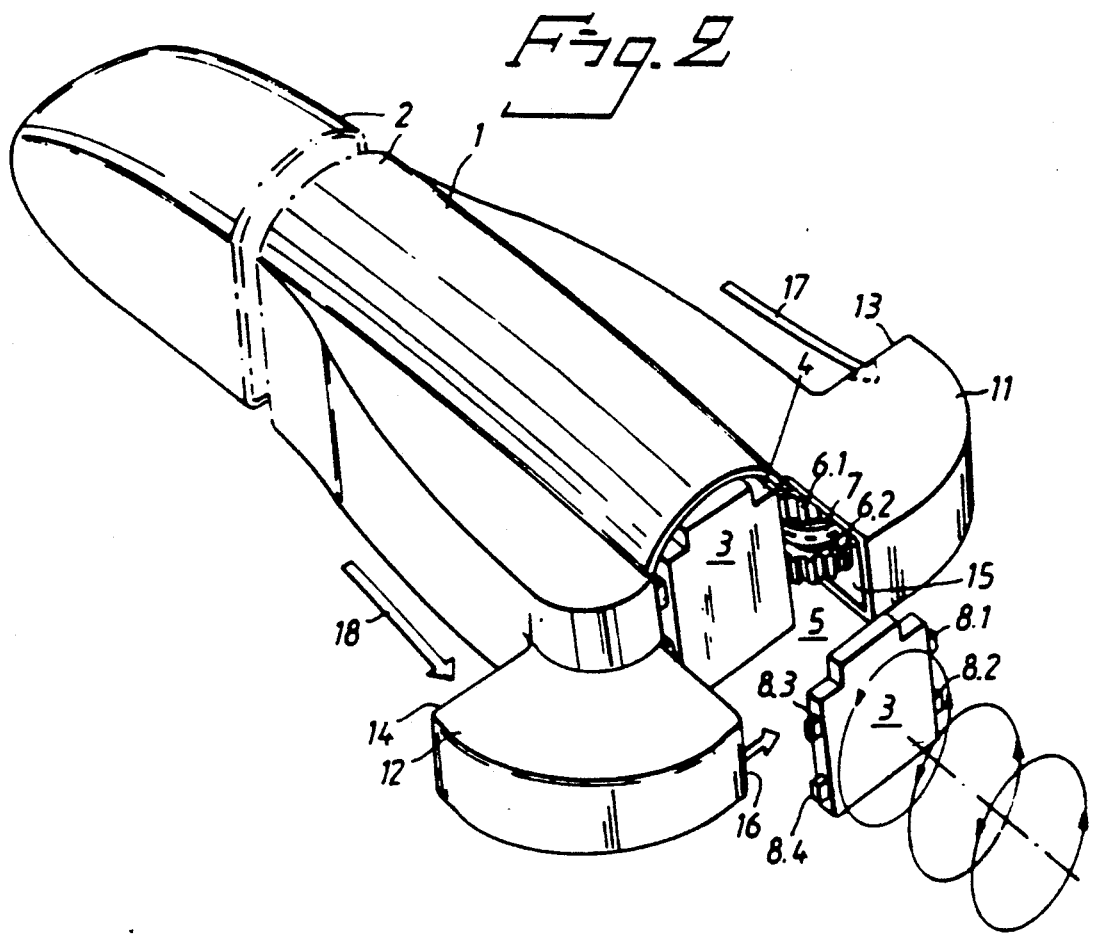
FIG. 2 shows a schematical perspective view of a dispenser according to the present invention provided with air guiding means.
Figure 3:
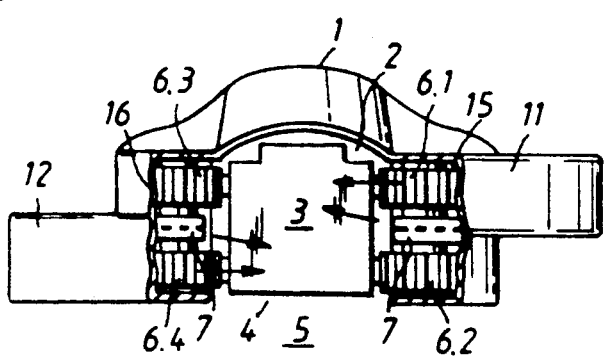
FIG. 3 shows the dispenser according to FIG. 2 in a further perspective view, the dispenser being presented essentially from the back.

FIGS. 2 and 3 show a dispenser according to the present invention. Corresponding elements have been given the same reference numerals as in FIG. 1 and the elongated body is as in FIG. 1 only partly shown. In order to change the air streams in the rear section of the dispenser, it is provided with air guiding means having shape of two air scoops 11, 12. Each air scoop is provided with an air inlet 13 and 14, respectively, positioned adjacent to the elongated body section 1 of the dispenser and an air outlet 15 and 16, respectively, at the feeding out opening 4 of the magazine 2. The opening planes of the air inlet are located essentially in planes perpendicular to the moving direction of the dispenser while the opening planes of the air outlets are located in planes essentially perpendicular to the plane of the feeding out opening 4. The air scoop 11 is applied adjacent to one of the vertical sides of the feeding out opening in its upper section while the air scoop 12 is applied adjacent to the opposite vertical side of the feeding out opening in its lower section. During the movement of the dispenser in the airspace, an air stream 17, 18 running along the long sides of the dispenser is catched by the air inlets 13, 14 of the air scoops 11, 12. When the air stream leaves the air outlets 15, 16, the air stream guided by the air scoops provides a vortex becoming three-dimensional when the free stream present behind the dispenser is superposed. By means of a strong and stable vortex immediately behind the dispenser, a pressure differential is generated pulling out packages 3 in the air stream behind the dispenser. The separation of the packages from the dispenser becomes distinct and repeatable.

The strength of the vortex is influenced, in addition to the flight speed, by the size of the air scoops and their location. The air stream condition behind the feeding out opening may be varied in that the exhaust directions of the air scoops are allowed to superpose each other to a higher or lower extent and due to that fact an optimation of the separation process of the packages.

The above described embodiment of the present invention is not limiting but many other embodiments lie within the scope of the invention. For example air guiding means may be totally or partly located on the inside of the dispenser.

We claim:

1. A dispenser to be used with an air craft, comprising:

a body member;

a magazine accommodated in said body member, said magazine being provided with a feeding out opening at one end thereof, said magazine accommodating a number of packages arranged in a row extending from said feeding out opening throughout said magazine, said magazine including a feeding out and separation device provided adjacent said feeding out opening for separating and feeding out a package in said row located closest to said feeding out opening of said magazine; and air guiding means provided on said body member to guide an air stream to said feeding out opening of said magazine in order to create a pressure differential at said feeding out opening acting to facilitate removal of packages, released by said feeding out and separation device, from said feeding out opening.

2. A dispenser as claimed in claim 1, wherein said air guiding means are air scoops, each air scoop being provided with an air inlet located adjacent to the side of said body member and an air outlet located adjacent to said feeding out opening.

3. A dispenser as claimed in claim 2, wherein the air scoops are disposed on said body member as pairs, each pair including one air scoop on opposite sides of said body member.

4. A dispenser as claimed in claim 3, wherein the air streams from the air outlet of the two air scoops of each said pair are opposite directed and mutually displacable in parallel relative to the center of the feeding out opening.

5. A dispenser as claimed in claim 1, wherein said air guiding means includes at least one pair of air scoops.

6. A dispenser to be used with an air craft, comprising:

a longitudinal body member;

a magazine extending in said body member, said magazine being provided with a feeding out opening at one end thereof, said magazine accommodating a plurality of packages arranged in a row and extending from said feeding out opening throughout said magazine, said magazine including a feeding out and separation device provided adjacent said feeding out opening for separating and feeding out a package in said row located closest to said feeding out opening of said magazine; and air guiding means provided on opposite sides of said longitudinal body member to guide an air stream into said feeding out opening of said magazine in order to create a pressure differential at said feeding out opening acting to facilitate removal of packages, released by said feeding out and separation device, from said feeding out opening.

* * * * *